(12) United States Patent
Nomura et al.

(10) Patent No.: US 7,079,750 B2
(45) Date of Patent: Jul. 18, 2006

(54) INFORMATION PROCESSING APPARATUS AND METHOD AS WELL AS PROGRAM STORAGE MEDIUM

(75) Inventors: Yasuo Nomura, Kanagawa (JP); Tatsuo Eguchi, Kanagawa (JP); Yasuhiko Terashita, Kanagawa (JP); Atsushi Kimura, Tokyo (JP); Nobuaki Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 09/773,911

(22) Filed: Feb. 2, 2001

(65) Prior Publication Data

US 2002/0056052 A1    May 9, 2002

(30) Foreign Application Priority Data

Feb. 3, 2000    (JP)    ............................ P2000-025912

(51) Int. Cl.
*H04N 5/76* (2006.01)
*H04N 7/00* (2006.01)
*H04N 7/08* (2006.01)
*G06F 13/00* (2006.01)

(52) U.S. Cl. ........................ 386/46; 386/83; 348/460; 348/461; 348/473; 348/474; 725/58

(58) Field of Classification Search .................... 386/1, 386/45, 46, 95, 83, 125–126; 725/58; 348/460, 348/461, 465, 467, 468, 473, 474; H04N 5/76, H04N 5/445, 7/00, 7/08, 7/84, 7/87, 11/00
See application file for complete search history.

(56) References Cited

U.S. PATENT DOCUMENTS

| 5,263,032 | A | * | 11/1993 | Porter et al. ................. 714/764 |
| 5,592,300 | A | * | 1/1997 | Huh ............................. 386/113 |
| 5,668,915 | A | * | 9/1997 | Baik et al. ..................... 386/46 |
| 5,907,365 | A | * | 5/1999 | Nishigaki et al. ........... 348/460 |
| 5,990,966 | A | * | 11/1999 | Watamoto .................... 348/460 |
| 6,721,486 | B1 | * | 4/2004 | Morisada ...................... 386/46 |

FOREIGN PATENT DOCUMENTS

EP    0 640 897 A1 *    3/1995

* cited by examiner

*Primary Examiner*—Thai Tran
(74) *Attorney, Agent, or Firm*—Oblon, Spivak, McClelland, Maier & Neustadt, P.C.

(57) ABSTRACT

An information processing apparatus supplies time information by a real-time-clock (RTC) that is corrected and a correction history is recorded. When a signal representing a correct-time indication is received, a correction processing section corrects a setting time provided from the RTC using the signal and a result of the correction is recorded into a log memory. When a signal representing a correct-time indication is not received or detected, the correction processing section records failure of correction of the setting time of the RTC into a log memory. The correction processing section is also capable of reading a history of correction information from the log memory and correcting the setting time provided by the RTC based on the correction history.

13 Claims, 16 Drawing Sheets

FIG. 9

NEW RESERVATION-SETTING OF CHANNEL AND STARTING DATE/TIME

A CHANNEL AND A STARTING DATE/HOUR OF RECORDING RESERVATION ARE SET.

CHANNEL  CH1, XHK1

STARTING DATA OF RECORDING  JANUARY 21, 2000

STARTING TIME OF RECORDING  16  25 MINUTE

☐ ADJUSTMENT OF STARTING TIME   RECORDING IS STARTED  0  MINUTE(S) PRIOR TO STARTING TIME
STARTING TIME OF RECORDING AFTER ADJUSTMENT  16:25

CLOCK HAS NOT BEEN CORRECTED.
LAST CORRECTION WAS MADE ON JANUARY 19, 2000.

[< RETURN (B)]  [NEXT (N) >]   [DECISION]  [CANCEL]  [HELP]

FIG.10

NEW RESERVATION-SETTING OF ENDING DATE/TIME AND RECORDING MODE

AN ENDING DATE/TIME OF RECORDING RESERVATION AND A RECORDING MODE ARE SET.

| CHANNEL | CH1,XHK1 |
| --- | --- |
| STARTING DATA OF RECORDING | 16:25, JANUARY 21, 2000 |

ENDING TIME OF RECORDING    JANUARY 21, 2000    21 ◁▷ O'CLOCK    00 ◁▷ MINUTE

☐ ADJUSTMENT OF ENDING TIME    ▷ 0 MINUTE(S) PRIOR TO STARTING TIME

STARTING TIME OF RECORDING AFTER ADJUSTMENT    16:25

RECORDING MODE
◉ NORMAL
○ HIGH PICTURE QUALITY
○ VIDEO CD COMPATIBLE

| RECORDING HOUR | 6 HOURS 05 MINUTES |
| --- | --- |
| USED AMOUNT OF DISK | 10749.23 (MB) |
| FREE CAPACITY OF DISK | 1246.61 (MB) |

< RETURN (B)    NEXT (N) >    DECISION    CANCEL    HELP

FIG.14

NEW RESERVATION-SETTING OF CHANNEL AND STARTING DATE/TIME

A CHANNEL AND A STARTING DATE/TIME OF RECORDING RESERVATION ARE SET.

CHANNEL  CH1,XHK1

STARTING DATA OF RECORDING  JANUARY 21, 2000

STARTING TIME OF RECORDING  16 0'CLOCK  25 MINUTE

☐ ADJUSTMENT OF STARTING TIME  RECORDING IS STARTED  0  MINUTE(S) PRIOR TO STARTING TIME
STARTING TIME OF RECORDING AFTER ADJUSTMENT  16:25

< RETURN (B)  NEXT (N) >  DECISION  CANCEL  HELP

FIG. 16

NEW RESERVATION-SETTING OF ENDING DATE/TIME AND RECORDING MODE

AN ENDING DATE/TIME OF RECORDING RESERVATION AND A RECORDING MODE ARE SET.

| | |
|---|---|
| CHANNEL | CH1,XHK1 |
| STARTING DATA OF RECORDING | 15:25, JANUARY 21, 2000 |
| ENDING TIME OF RECORDING | JANUARY 21, 2000   21 ◁▷ O'CLOCK   00 ◁▷ MINUTE |
| ☑ ADJUSTMENT OF ENDING TIME | ENDING TIME IS EXTENDED   ▷ MINUTE(S) |
| | ENDING TIME OF RECORDING AFTER ADJUSTMENT   21:30 |
| | 30 / 30 / 60 / 90 |

RECORDING MODE
- ◉ NORMAL
- ○ HIGH PICTURE QUALITY
- ○ VIDEO CD COMPATIBLE

| | |
|---|---|
| RECORDING HOUR | 6 HOURS 05 MINUTES |
| USED AMOUNT OF DISK | 1074923 (MB) |
| FREE CAPACITY OF DISK | 124661 (MB) |

< RETURN (B)    NEXT (N) >    DECISION    CANCEL    HELP

INFORMATION PROCESSING APPARATUS AND METHOD AS WELL AS PROGRAM STORAGE MEDIUM

BACKGROUND OF THE INVENTION

This invention relates to an information processing apparatus and method as well as a program storage medium, and more particularly to an information processing apparatus which includes a built-in clock and an information processing method and a program storage medium for the information processing apparatus.

A personal computer which includes a built-in tuner is available. The personal computer receives image and sound signals from a television broadcasting station, converts the received image and sound signals into predetermined digital data, records the digital data onto a recording medium such as a hard disk and plays back the recorded digital data when necessary.

Meanwhile, a stationary video deck for domestic use makes use of a technique of supervising a correct-time indication broadcast at a predetermined time to correct a built-in clock.

However, if a tuner receives, at a predetermined time at which a correct-time indication is broadcast, a broadcast of some other broadcasting station which does not broadcast a correct-time indication, then the built-in clock of the tuner cannot be corrected. Further, a conventional tuner does not have measures for allowing a user thereof to confirm whether or not the built-in clock has been corrected. Therefore, for example, if the built-in clock is not corrected for a long period of time, then the user may not become aware that the built-in clock has not been corrected.

SUMMARY OF THE INVENTION

It is an object of the present invention to provide an information processing apparatus and method and a program storage medium by which a user can be notified whether or not a built-in clock is corrected properly.

It is another object of the present invention to provide an information processing apparatus and method and a program storage medium by which a user can confirm a history of correction of a built-in clock.

It is a further object of the present invention to provide an information processing apparatus and method and a program storage medium by which a built-in clock can be corrected even when correction thereof based on a correct-time indication is impossible.

In order to attain the objects described above, according to the present invention, a history of correction of a built-in clock is stored. In other words, each time the built-in clock is corrected, contents of the correction are stored. Then, when necessary, the history of correction of the built-in clock is recalled and used so that the user can discriminate whether or not the built-in clock has been corrected properly, confirm the history of correction of the built-in clock or correct the built-in clock based on the history of correction of the built-in clock.

In particular, according to an aspect of the present invention, there is provided an information processing apparatus, comprising time information supply means for supplying time information to be used for management of operation of the information processing apparatus, reception control means for controlling reception of a broadcasting wave, detection means for detecting predetermined information from the broadcasting wave received under the control of the reception control means within a period from a first point of time to a second point of time based on the time information supplied from the time information supply means, time correction means for correcting the time information supplied from the time information supply means based on a result of the detection of the detection means, and recording means for recording a result of the correction of the time information by the time correction means.

According to another aspect of the present invention, there is provided an information processing method, comprising a time information supply step of supplying time information to be used for management of operation of an information processing apparatus, a reception control step of controlling reception of a broadcasting wave, a detection step of detecting predetermined information from the broadcasting wave received under the control of the processing of the reception control step within a period from a first point of time to a second point of time based on the time information supplied by the processing of the time information supply step, a time correction step of correcting the time information supplied by the processing of the time information supply step based on a result of the detection by the processing of the detection step, and a recording control step of controlling recording of a result of the correction of the time information by the processing of the time correction step.

According to a further aspect of the present invention, there is provided a program storage medium on which a computer-readable program is recorded, the program comprising a time information supply step of supplying time information to be used for management of operation of an information processing apparatus, a reception control step of controlling reception of a broadcasting wave, a detection step of detecting predetermined information from the broadcasting wave received under the control of the processing of the reception control step within a period from a first point of time to a second point of time based on the time information supplied by the processing of the time information supply step, a time correction step of correcting the time information supplied by the processing of the time information supply step based on a result of the detection by the processing of the detection step, and a recording control step of controlling recording of a result of the correction of the time information by the processing of the time correction step.

In the information processing apparatus, the information processing method and the program stored in the program storage medium, time information to be used for management of operation of the information processing apparatus is supplied, and a broadcasting wave is received. Further, predetermined information is detected from the received broadcasting wave within a period from a first point of time to a second point of time, and the time information is corrected based on a result of the detection. Then, a result of the correction of the time information is recorded. Consequently, it is possible to notify the user whether or not a built-in clock has been corrected properly, to allow the user to confirm the correction history of the built-in clock or to allow, when correction of the time based on a correct-time indication cannot be performed, the built-in clock to be corrected based on the correction history.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 9 and 10 are schematic views illustrating setting screens of recording reservation;

FIGS. 14 to 16 are schematic views illustrating setting screens of recording reservation;

DESCRIPTION OF THE PREFERRED EMBODIMENT

Figure 1:
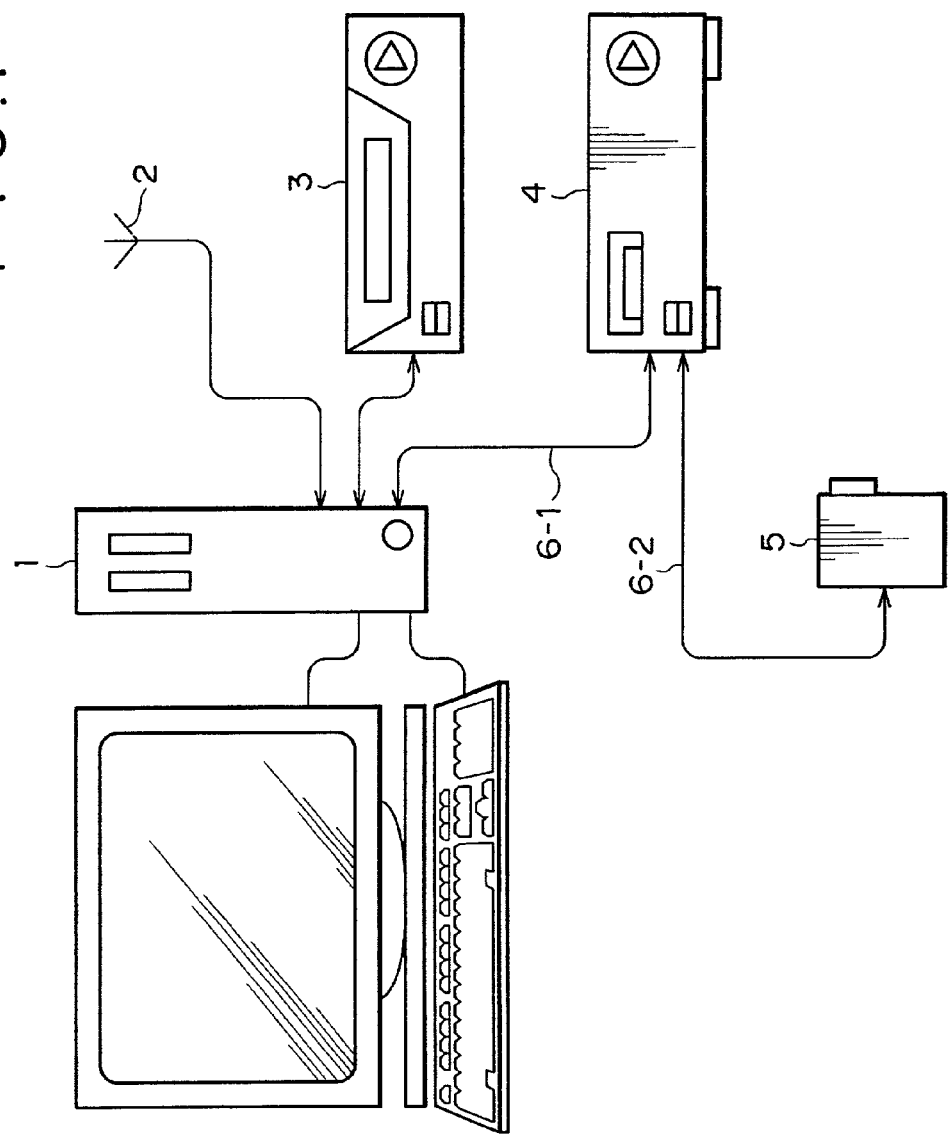
FIG. 1 is a schematic view showing an image recording and playback system to which the present invention is applied.

Referring first to FIG. 1, there is shown an image recording and playback system to which the present invention is applied. The image recording and playback system includes an antenna 2 for receiving a radio wave transmitted from a predetermined television broadcasting station not shown, and a personal computer 1 which receives a signal supplied from the antenna 2, reproduces predetermined image and sound signals from the received signal and records the image and sound signals. The personal computer 1 receives an analog signal supplied from a video cassette recorder (VCR) 3, produces image and sound signals from the received analog signal and records the image and sound signals. The personal computer 1 further receives digital data supplied from a digital video cassette recorder (DVCR) 4 through a network 6-1 or receives digital data supplied from another DVCR 5 with an image pickup function through another network 6-2 and the DVCR 4 and the network 6-1. The personal computer 1 reproduces image and sound signals from the received digital data and records the image and sound signals. Typically, the networks 6-1 and 6-2 may each be formed from an IEEE (Institute of Electrical and Electronic Engineers) 1394 network.

The personal computer 1 supplies an analog signal such as, for example, an analog signal of the NTSC (National Television System Committee) system corresponding to image and sound signals recorded therein to the VCR 3 or supplies digital data corresponding to image and sound signals recorded therein to the DVCR 4. In addition, the personal computer 1 can edit the recorded image and sound signals.

Figure 2:
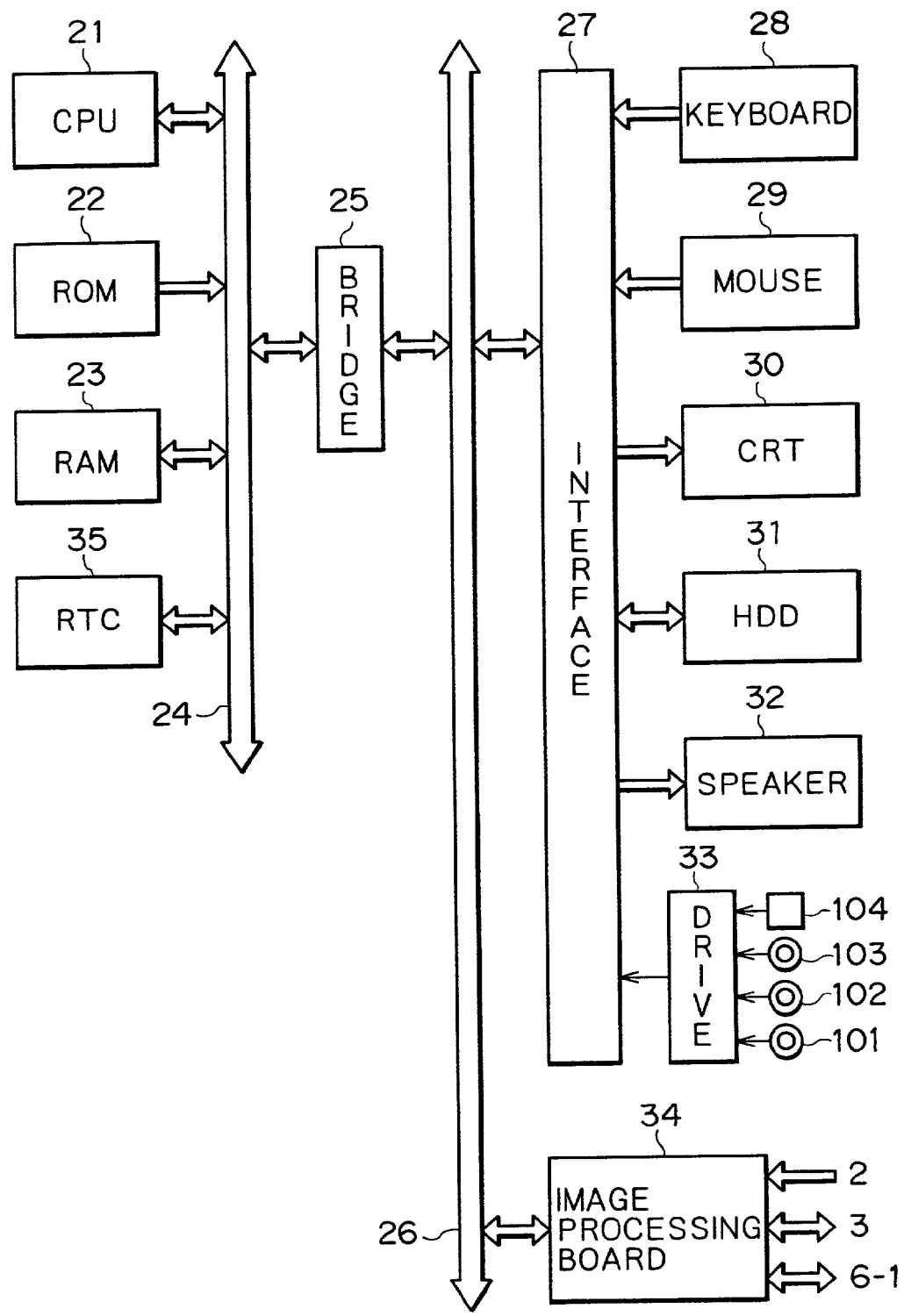
FIG. 2 is a block diagram showing a construction of a personal computer shown in FIG. 1.

FIG. 2 is a block diagram showing a construction of the personal computer 1. Referring to FIG. 2, a CPU (central processing unit) 21 actually executes various application programs and a basic OS (operating system). A ROM (read-only memory) 22 commonly stores a program to be used by the CPU 21 and basically fixed data of parameters for arithmetic operation. A RAM (random-access memory) 23 stores a program used for execution of the CPU 21 and parameters which vary suitably in such execution. A RTC (Real Time Clock) 35 supplies time data to be used to control operation of the personal computer 1. For example, where a program used by the CPU 21 such as, for example, a reservation/time supervision program which is hereinafter described with reference to FIG. 4 need refer to the time, the CPU 21 refers to the RTC 35 to execute the program. The CPU 21, ROM 22, RAM 23, and RTC 35 are connected to each other suitably by a host bus 24 which may be formed from a CPU bus or a memory bus.

The host bus 24 is connected to an external bus 26 such as a PCI (Peripheral Component Interconnect/Interface) by a bridge 25.

A keyboard 28 is operated by a user in order to input various instructions to the CPU 21. A mouse 29 is operated by the user in order to indicate or select a point on a screen of a CRT (cathode ray tube) 30. The CRT 30 displays various information in the form of a text or an image. A HDD (hard disk drive) 31 drives hard disks to record or play back a program to be executed by the CPU 21 or information onto or from the hard disks. A speaker 32 reproduces predetermined sound. Onto a drive 33, a magnetic disk 101, an optical disk 102, a magneto-optical disk 103 or a semiconductor memory 104 is loaded when necessary to communicate data with the drive 33.

The components 28 to 33 mentioned above are connected to an interface 27. The interface 27 is connected to the CPU 21 through the external bus 26, bridge 25 and host bus 24.

An image processing board 34 is controlled by the CPU 21 and produces predetermined image or sound data based on a signal supplied from the antenna 2, an analog image or sound signal supplied from the VCR 3 or digital image or sound data supplied from the DVCR 4 or the DVCR 5 through the network 6-1 and outputs the produced image or sound data to the HDD 31 through the external bus 26 and the interface 27.

The image processing board 34 receives an input of image or sound data recorded on the HDD 31 through the external bus 26 and the interface 27, produces an analog signal corresponding to the inputted image or sound data and supplies the analog signal to the VCR 3, or produces digital data corresponding to the inputted image or sound data and supplies the digital data to the DVCR 4 through the network 6-1.

The image processing board 34 is connected to the CPU 21 through the external bus 26, bridge 25 and host bus 24.

Now, a construction of the image processing board 34 is described with reference to FIG. 3. A 1394 interface 51 is configured in conformity with the prescription of the IEEE 1394 and connected to the network 6-1. The 1394 interface 51 thus receives digital image or sound data of the VCR format supplied thereto from the DVCR 4 or the DVCR 5 in accordance with a protocol which complies with the prescription of the IEEE 1394 and supplies the digital image or sound data to a DV (digital video) data interface 52.

Further, the 1394 interface 51 supplies digital image or sound data of the DVCR format supplied thereto from the DV data interface 52 to the DVCR 4 in accordance with a protocol which complies with the prescription of the IEEE 1394.

The DV data interface 52 outputs digital image or sound data of the DVCR format supplied thereto from the 1394 interface 51 or digital image or sound data supplied thereto from a digital selector 57 such as, for example, digital data which are not in a compressed form of 4:1:1 or the like. Further, the DV data interface 52 outputs digital image or sound data of the DVCR format supplied thereto from a DV data compression-decompression circuit 53 and outputs digital image or sound data not in a compressed form supplied thereto from the DV data compression-decompression circuit 53 to the digital selector 57.

The DV data compression-decompression circuit 53 decompresses digital image or sound data of the DVCR format thereto supplied from the DV data interface 52 into non-compressed digital image or sound data and outputs the decompressed data to the DV data interface 52. Further, the DV data compression-decompression circuit 53 compresses non-compressed digital image or sound data supplied thereto from the DV data interface 52 into digital image or sound data of the DVCR format and outputs the compressed data to the DV data interface 52.

A tuner 54 receives a RF (radio frequency) signal supplied thereto from the antenna 2 and outputs an analog image and sound signal of a predetermined channel to an analog selector 55. The analog selector 55 selects one of analog image or sound signals supplied thereto from the tuner 54, the VCR 3 and a D/A (digital/analog) conversion circuit 61 and outputs the selected signal to an A/D (analog/digital) conversion circuit 56 or the VCR 3.

The A/D conversion circuit 56 converts an analog image and sound signal supplied thereto from the analog selector 55 into digital data such as, for example, digital image data of 4:1:1 and outputs the digital data to the digital selector 57. The digital selector 57 receives digital image and sound data outputted from the DV data interface 52, the A/D conversion circuit 56 or an MPEG (Moving Picture Experts Group) decoder 60, selects one of the received digital image and sound data and outputs selected data to the DV data interface 52, an MPEG encoder 58 or the D/A conversion circuit 61 and also to a bridge 59. The digital selector 57 further outputs information of a scene changing position to the bridge 59.

The MPEG encoder 58 compresses digital image and sound data supplied thereto from the digital selector 57 into digital data of the MPEG system and outputs the compressed data to the bridge 59. The MPEG encoder 58 further converts an image signal at a scene change into a still picture and outputs the still picture to the bridge 59.

The bridge 59 outputs non-compressed digital image and sound data supplied from the digital selector 57 to the CRT 30 through the PCI bus 26 and the interface 27 of the personal computer 1 in which the image processing board 34 is incorporated. The bridge 59 further outputs digital image and sound data of the MPEG system supplied thereto from the MPEG encoder 58 to the HDD 31 or the CPU 21 through the PCI bus 26 of the personal computer 1 in which the image processing board 34 is incorporated. Furthermore, the bridge 59 receives digital image and sound data of the MPEG system from the HDD 31 of the personal computer 1 through the PCI bus 26 and outputs the received data to the MPEG decoder 60.

The MPEG decoder 60 decompresses the digital image and sound data of the MPEG system thereto supplied from the bridge 59 to produce non-compressed digital image and sound data and outputs the produced data to the digital selector 57.

The D/A conversion circuit 61 converts the digital image and sound data supplied thereto from the digital selector 57 into an analog signal and outputs the analog signal to the analog selector 55.

It is to be noted that processing performed by the MPEG encoder 58 and/or the MPEG decoder 60 may be executed by the CPU 21 in accordance with a predetermined program.

Figure 4:
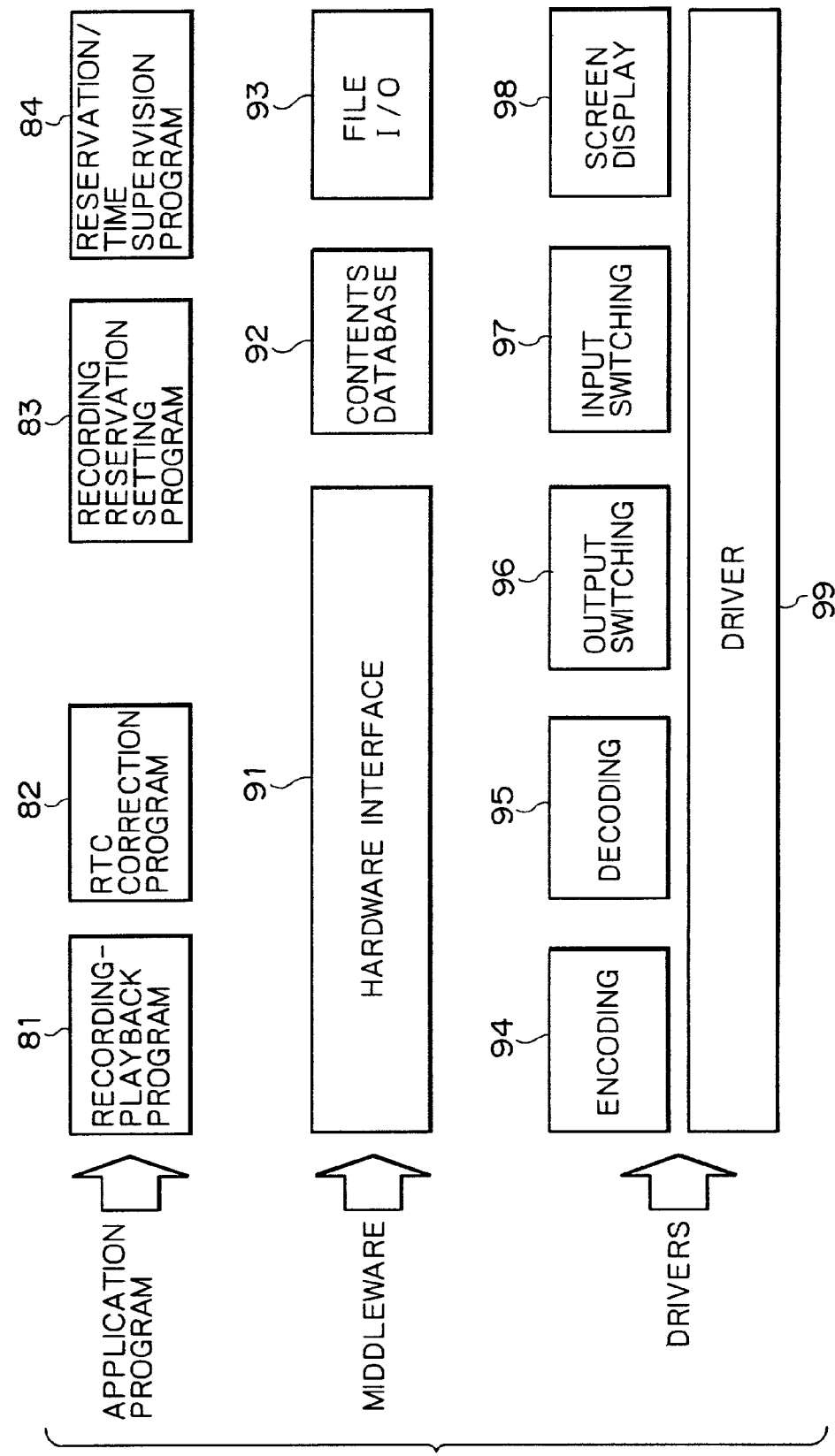
FIG. 4 is a block diagram showing a construction of an application program executed by the personal computer, middleware, and drivers.

FIG. 4 illustrates a configuration of application programs executed by the personal computer 1, middleware and drivers. The middleware controls the drivers in accordance with a request from an application program. The drivers cause resources of predetermined hardware such as the MPEG encoder 58 of the image processing board 34 to operate actually.

A recording-playback program 81 causes the image processing board 34 to select one of an analog image and sound signal of a predetermined channel received by the tuner 54, an analog image and sound signal supplied from the VCR 3 or digital image and sound data supplied from the DVCR 4 through the network 6-1, convert the selected analog signal or digital data into digital image or sound data of the MPEG system and record the data as AV (Audio Visual) contents formed from one or more files of a predetermined format onto the HDD 31.

Further, the recording-playback program 81 causes the image processing board 34 to decompress AV contents recorded as one or more files of a predetermined format on the HDD 31 to produce predetermined non-compressed digital image or sound data, causes the CRT 30 to display an image of the image data or causes the speaker 32 to play back sound of the sound data.

A RTC correction program 82 causes the tuner 54 to receive and detect a correct-time indication broadcast at a predetermined time such as, for example, a correct-time indication at A.M. 12:00 of channel 13 and correct the time of the RTC 35. Details of the RTC correction program 82 are hereinafter described with reference to FIG. 5.

A recording reservation setting program 83 causes the CRT 30 to display a GUI (Graphical User Interface) for allowing a user to perform setting of recording reservation, produces AV contents for execution of recording reservation based on setting inputted using the keyboard 28 or the mouse 29 by the user referring to the GUI and records the AV contents into a contents database 92. Details of the recording reservation setting program 83 are hereinafter described with reference to FIG. 7.

A reservation/time supervision program 84 normally operates or is resident when the personal computer 1 is operating (when the OS is operating) to execute recording reservation based on AV contents for execution of recording reservation produced by the recording reservation setting program 83 and time information supplied thereto from the RTC 35. Further, the reservation/time supervision program 84 supervises the RTC 35 and starts up the RTC correction program 82 at a predetermined point of time.

A hardware interface 91 arbitrates use of a hardware resource requested by the recording-playback program 81, RTC correction program 82, recording reservation setting program 83 or reservation/time supervision program 84 so that an application program may appropriately utilize a predetermined hardware resource based on setting such as various priorities.

The contents database 92 manages data of attributes of AV contents and provides data for specifying a file in which attribute data of AV contents or digital image or sound data corresponding to AV contents is stored to the recording-playback program 81, recording reservation setting program 83 or reservation/time supervision program 84.

A file I/O (Input/Output) 93 actually executes reading out or writing of data into or from a predetermined file of the contents database 92 in response to a reading or writing request for predetermined AV contents (formed from one or more files) of the recording-playback program 81, recording reservation setting program 83 or reservation/time supervision program 84.

An encode 94 executes control to cause the MPEG encoder 58 of the image processing board 34 to compress image or sound data inputted thereto from the digital selector 57 into digital data of the MPEG system.

A decode 95 executes control to cause the MPEG decoder 60 of the image processing board 34 to decompress image or sound data of the MPEG system inputted from the bridge 59.

An output switching 96 controls the analog selector 55 and the 1394 interface 51 of the image processing board 34 to operate to control outputting of an analog signal from the image processing board 34 or of digital data through the network 6-1.

An input switching 97 controls the analog selector 55, 1394 interface 51, DV data interface 52 and digital selector 57 of the image processing board 34 to select an analog signal or digital data to be inputted to the image processing board 34.

A screen display 98 controls the digital selector 57 and the bridge 59 to control displaying of an image on the CRT 30.

A driver 99 is a program for causing the image processing board 34 to actually operate in response to a request from the encode 94, decode 95, output switching 96, input switching 97 or screen display 98.

Figure 5:
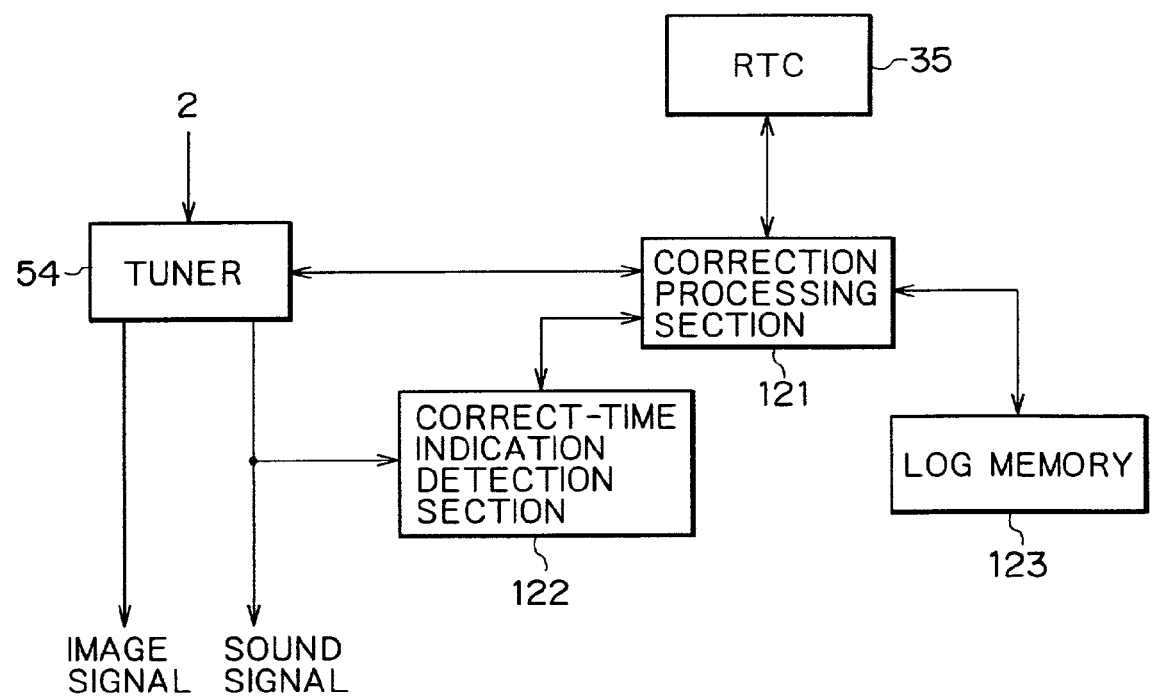
FIG. 5 is a functional block diagram illustrating an RTC correction program.

FIG. 5 is a functional block diagram when the RTC correction program 82 is loaded into the CPU 21 and then started up.

A correction processing section 121 detects a channel of a broadcast being received by the tuner 54 through the antenna 2 and refers to a present time indicated by the RTC 35 to change the channel to be received by the tuner 54 when necessary. Further, the correction processing section 121 changes the setting of the time of the RTC 35 based on a signal inputted thereto from a correct-time indication detection section 122 and records contents of the change or data representing that the change of the setting has failed into a log memory 123. The log memory 123 is part of a storage area of the HDD 31 and stores data inputted thereto from the correction processing section 121. The correct-time indication detection section 122 detects a frequency and the number of times of the frequency of sound data indicating a correct-time indication from a frequency of sound data received by the tuner 54 to detect reception of a correct-time indication.

The correction processing section 121 refers to the time supplied thereto from the RTC 35 to check whether or not the tuner 54 receives a broadcast within a period from a predetermined point of time to another predetermined point of time (for example, within a period from 11:55 to 12:05). If the tuner 54 receives a broadcast, then the correction processing section 121 checks what channel is received.

If the tuner 54 does not receive any broadcast within the period from 11:55 to 12:05, then the correction processing section 121 causes the tuner 54 to receive a broadcast of channel 13 and causes the correct-time indication detection section 122 to start supervision of reception of a correct-time indication at 12:00. The correct-time indication detection section 122 supervises the frequency of a sound signal received by the tuner 54 to detect frequencies of the correct-time indication at 12:00 and the numbers of times of the frequencies (five times of 440 Hz and one time of 880 Hz) to detect reception of a correct-time indication. Then, if reception of a correct-time indication is detected, then the correct-time indication detection section 122 outputs a signal for notification of detection of reception of a correct-time indication to the correction processing section 121. The correction processing section 121 receives an input of the signal indicative of the detection of reception of a correct-time indication, corrects the setting time of the RTC 35 to 12:00:α (α is different depending upon the time required for correction processing of the setting time of the RTC 35 after reception of a correct-time indication), and records a correction result (data representing on what date (month and day) by how many seconds the setting time is delayed or advanced) into the log memory 123.

Also when it is discriminated that the tuner 54 receives the channel 13 within the period from 11:55 to 12:05, similar processing is performed without changing the reception channel of the tuner 54.

Then, if it is discriminated that the tuner 54 receives a broadcast of a channel other than the channel 13 or if a signal representing detection of a correct-time indication is not inputted from the correct-time indication detection section 122 even when the present time supplied from the RTC 35 exhibits 12:05, the correction processing section 121 records data representing failure in correction of the setting time of the RTC 35 into the log memory 123.

Subsequently, an RTC correction process is described with reference to a flow chart of FIG. 6.

First in step S1, the CPU 21 which executes processing of the reservation/time supervision program 84 discriminates whether or not the present time supplied from the RTC 35 is 11:55. If it is discriminated in step S1 that the present time is not 11:55, then the processing in step S1 is repeated until it becomes discriminated that the present time is 11:55.

If it is discriminated in step S1 that the present time is 11:55, then the CPU 21 starts up the RTC correction program 82 in step S2.

In step S3, the correction processing section 121 discriminates whether or not the tuner 54 is receiving a broadcast of a channel other than the channel 13. If it is discriminated in step S3 that the tuner 54 is receiving a broadcast of a channel other than the channel 13, then the processing advances to step S8.

On the other hand, if it is discriminated in step S3 that the tuner 54 is not receiving a broadcast of a channel other than the channel 13, the correction processing section 121 causes the tuner 54 to receive the broadcast of the channel 13 and the correct-time indication detection section 122 fetches a sound signal of the broadcast of the channel 13 being received and starts supervision of the correct-time indication at 12:00 in step S4. The correct-time indication detection section 122 supervises the frequency of the sound signal fetched from the tuner 54, and outputs, when it confirms that signals of the frequencies indicating the correct-time indication are received by the predetermined numbers of time, a signal representative of detection of a correct-time indication to the correction processing section 121.

In step S5, the correction processing section 121 discriminates based on the signal supplied thereto from the correct-time indication detection section 122 whether or not the correct-time indication at 12:00 has been confirmed successfully.

If it is discriminated in step S5 that the correct-time indication at 12:00 has been confirmed successfully, then the new correction processing section 121 corrects the setting time of the RTC 35 to 12:00:α (α is different depending upon the time required for correction processing of the setting time of the RTC 35 after reception of a correct-time indication) in step S6. Further, the correction processing section 121 records a result of the correction (data representing on what date (month and day) by how many seconds the setting time is delayed or advanced) into the log memory 123.

If it is discriminated in step S5 that the correct-time information at 12:00 has not been confirmed successfully, then the correction processing section 121 refers to the RTC 35 in step S8 to discriminate whether or not the present time is 12:05. If it is discriminated in step S8 that the present time is not 12:05, then the processing returns to step S3 so that the processing in step S3 et seq. described above is repeated.

If it is discriminated in step S8 that the present time is 12:05, then the correction processing section 121 records, in step S9, information that the setting time of the RTC 35 has not been corrected successfully into the log memory 123.

In step S10, the CPU 21 ends the RTC correction program 82 and thereby ends the processing.

In this manner, in the RTC correction process, reception of a correct-time indication is supervised for a period from a predetermined point of time to another point of time, and if a correct-time indication is received and the RTC 35 is corrected based on the correct-time indication, then contents of the correction are stored into the log memory 123. However, if a correct-time indication is not received successfully and the RTC 35 is not corrected successfully, then information that the RTC 35 is not corrected successfully is stored into the log memory 123. Consequently, in a recording reservation setting process which is hereinafter described, a user can be notified of a correction situation of the RTC 35.

Figure 7:
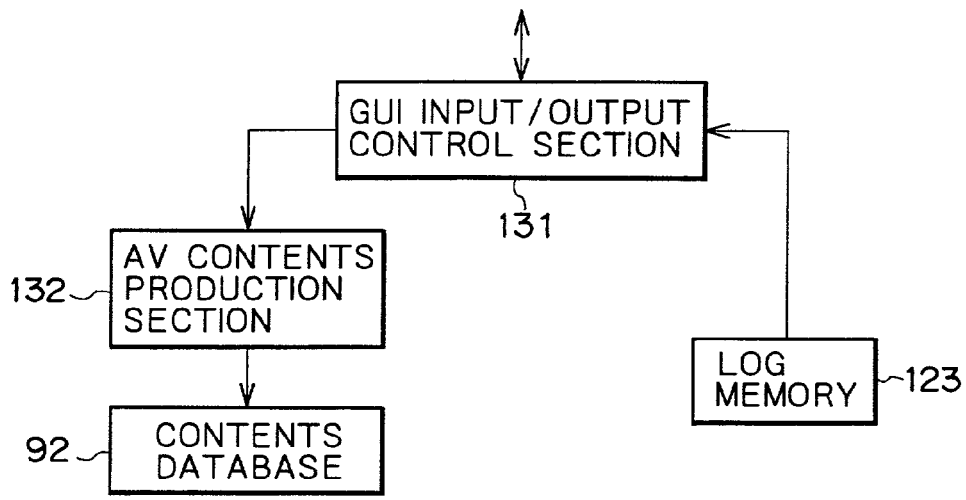
FIG. 7 is a functional block diagram illustrating a recording reservation setting program.

FIG. 7 is a functional block diagram when the recording reservation setting program 83 is loaded into the CPU 21 and started up.

A GUI input/output control section 131 reads out data for a GUI to be used for setting of recording reservation by a user from the HDD 31 and controls the CRT 30 to display the data. At this time, the GUI input/output control section 131 reads out a processing result of the RTC correction program described hereinabove with reference to FIG. 5 from the log memory 123 and causes the CRT 30 to display the processing result on a GUI when necessary. Further, the GUI input/output control section 131 receives an input of setting inputted using the keyboard 28 or the mouse 29 by the user referring to the GUI and supplies the setting input to an AV contents production section 132.

The AV contents production section 132 produces AV contents based on the setting of recording reservation inputted from the GUI input/output control section 131 and records the AV contents into the contents database 92. The AV contents include various setting contents for allowing reserved recording to be executed such as a recording starting time, a recording ending time, a reception channel, and a recording mode which determines the picture quality.

The recording reservation setting program 83 may otherwise cause the CRT 30 to display an icon representing the recording reservation setting program 83 such that it may be started up when the user double clicks the icon using the mouse 29.

Figure 8:
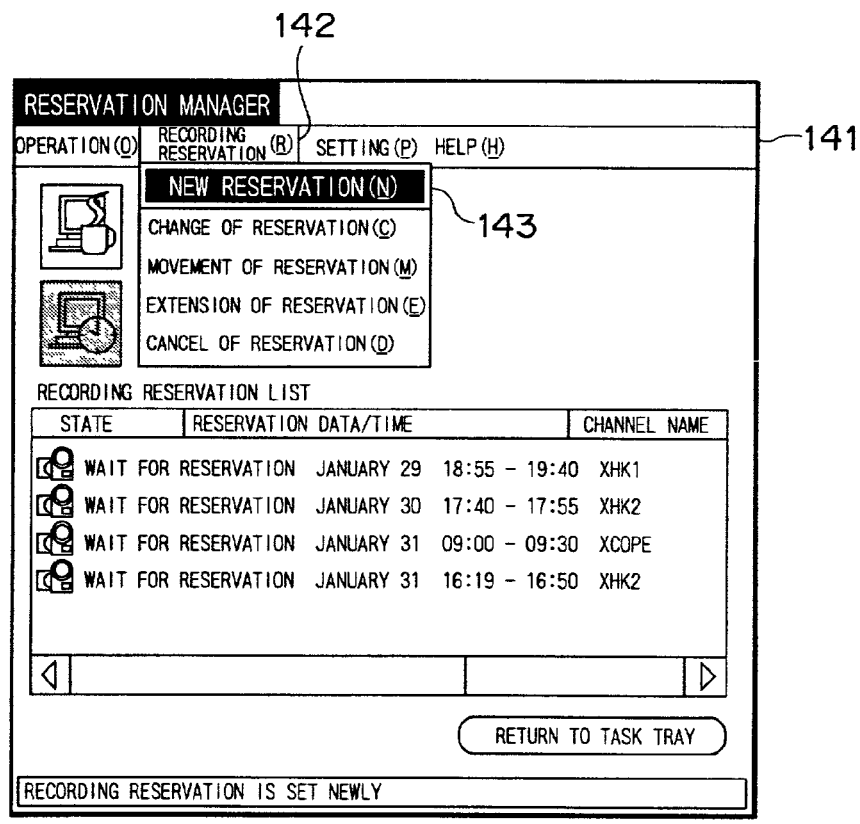
FIG. 8 is a schematic view showing a display screen when a picture recording reservation setting program is started up.

FIG. 8 shows a GUI 141 displayed on the CRT 30 when the recording reservation setting program 83 is started up. When the user wants to perform setting of new reservation, it can click a recording reservation button 142 on a tool bar to cause a menu 143 to be displayed and select the new reservation so that a GUI 151 shown in FIG. 9 to be used to input new reservation setting is displayed.

The user can select one of those of buttons displayed at a lower portion of any GUI displayed on the display screen of the CRT 30 which are in a selectable (active) state using the keyboard 28 or the mouse 29 to move to another GUI screen preceding to or succeeding the GUI. For example, if the GUI input/output control section 131 receives an input of a signal representing that a "to next" button 153 is selected by the user while the GUI 151 of FIG. 9 is displayed on the CRT 30, then the GUI input/output control section 131 reads out data corresponding to a GUI 161 of FIG. 10 from the HDD 31 and causes the CRT 30 to display the data. On the other hand, if the GUI input/output control section 131 receives an input of another signal representing that a "return" button 163 is selected by the user while the GUI 161 of FIG. 10 is displayed on the CRT 30, then the GUI input/output control section 131 reads out data corresponding to the GUI 151 of FIG. 9 from the HDD 31 and causes the CRT 30 to display the data. Then, the user will arbitrarily change over between the GUI 151 and the GUI 161 to perform setting of recording reservation.

Various setting contents inputted to a setting inputting section 152 (FIG. 9) or another setting inputting section 162 (FIG. 10) by the user are inputted to the GUI input/output control section 131. Then, when all setting is ended, the user can select a "decision" button 164 (FIG. 10) to end the recording reservation setting. When the GUI input/output control section 131 receives an input of a signal representing that the "decision" button 164 is selected by a user, it outputs the various setting contents inputted thereto to the AV contents production section 132. The AV contents production section 132 produces AV contents for recording reservation based on the inputted various setting contents and stores the AV contents into the contents database 92.

Figure 11:
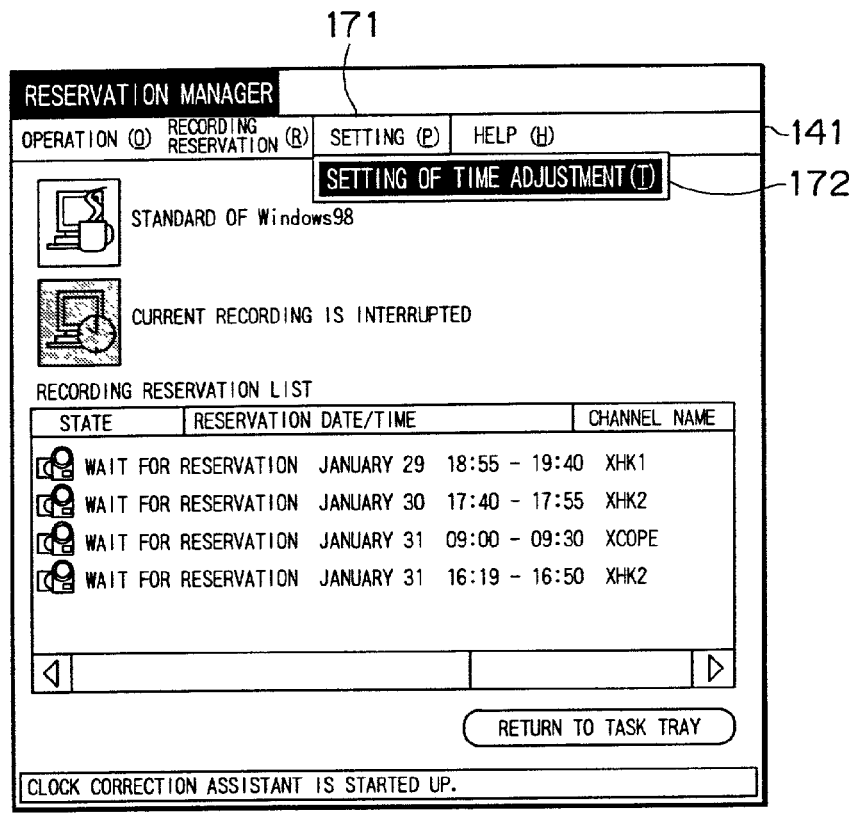
FIG. 11 is a schematic view illustrating a procedure for displaying a correction history.
Figure 12:
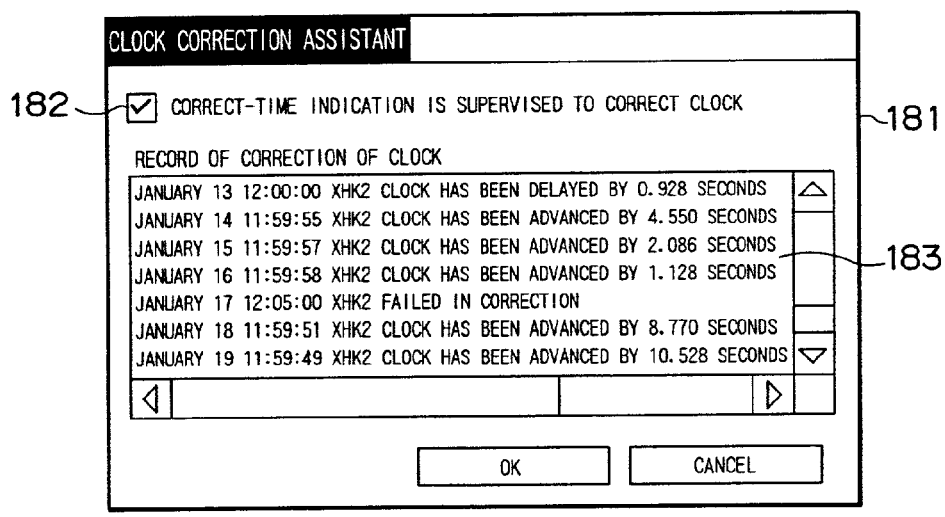
FIG. 12 is a schematic view illustrating a display screen of a correction history.

On the other hand, if the user clicks a setting button 171 on a tool bar shown in FIG. 11 to select setting for time adjustment on a menu 172, then the GUI input/output control section 131 reads out a correction history of the RTC 35 from the log memory 123 and causes the CRT 30 to display a GUI 181 shown in FIG. 12 which is a setting screen for time adjustment. A check box 182 is used for selection by user of whether or not the RTC correction process described hereinabove with reference to FIG. 6 should be performed. If the check box 182 is checked, then the RTC correction process described hereinabove with reference to FIG. 6 is performed. In a list box 183, a correction history by the RTC correction process is displayed.

Subsequently, a recording reservation setting process is described with reference to a flow chart of FIG. 13.

For example, if an icon representative of the recording reservation setting program 83 displayed on the CRT 30 is double clicked by the user using the mouse 29, then the CPU 21 starts up the recording reservation setting program 83 in step S21. The GUI input/output control section 131 reads out data corresponding to the GUI 141 described hereinabove with reference to FIG. 8 from the HDD 31 and causes the CRT 30 to display the data. Then, the GUI input/output control section 131 receives a signal representing that new reservation is selected from within the menu 143 by the user using the keyboard 28 or the mouse 29.

In step S22, the GUI input/output control section 131 reads in the correction records of the RTC 35 recorded in the log memory 123.

In step S23, the GUI input/output control section 131 discriminates based on the correction records of the RTC 35 read in in step S22 whether or not the latest correction record represents that the setting time of the RTC 35 was corrected.

If it is discriminated in step S23 that the latest correction record represents that the setting time of the RTC 35 was not corrected, then in step S24, the GUI input/output control section 131 reads out the data corresponding to the GUI 151 shown in FIG. 9 from the HDD 31 and causes the CRT 30 to display the data. Here, in order to facilitate understanding to the user of a message 154 which is displayed in order to indicate to the user that the setting time of the RTC 35 was not corrected, the RTC 35 is represented as "clock". The user can confirm the GUI 151 and recognize that the setting time of the RTC 35 was not corrected and the latest correction date.

If it is discriminated in step S23 that the latest correction record indicates that the setting time of the RTC 35 was corrected, then in step S25, the GUI input/output control section 131 reads out data corresponding to the GUI 151 shown in FIG. 14 from the HDD 31 and causes the CRT 30 to display the data. The user can confirm the GUI 151 and recognize that the setting time of the RTC 35 was corrected from the fact that the message 154 is not displayed.

In step S26, the GUI input/output control section 131 discriminates whether or not an "adjustment of starting time" check box 155 of the GUI 151 shown in FIG. 9 or 14 is checked. If it is discriminated in step S26 that the check box 155 is not checked, then the processing advances to step S28.

Figure 15:
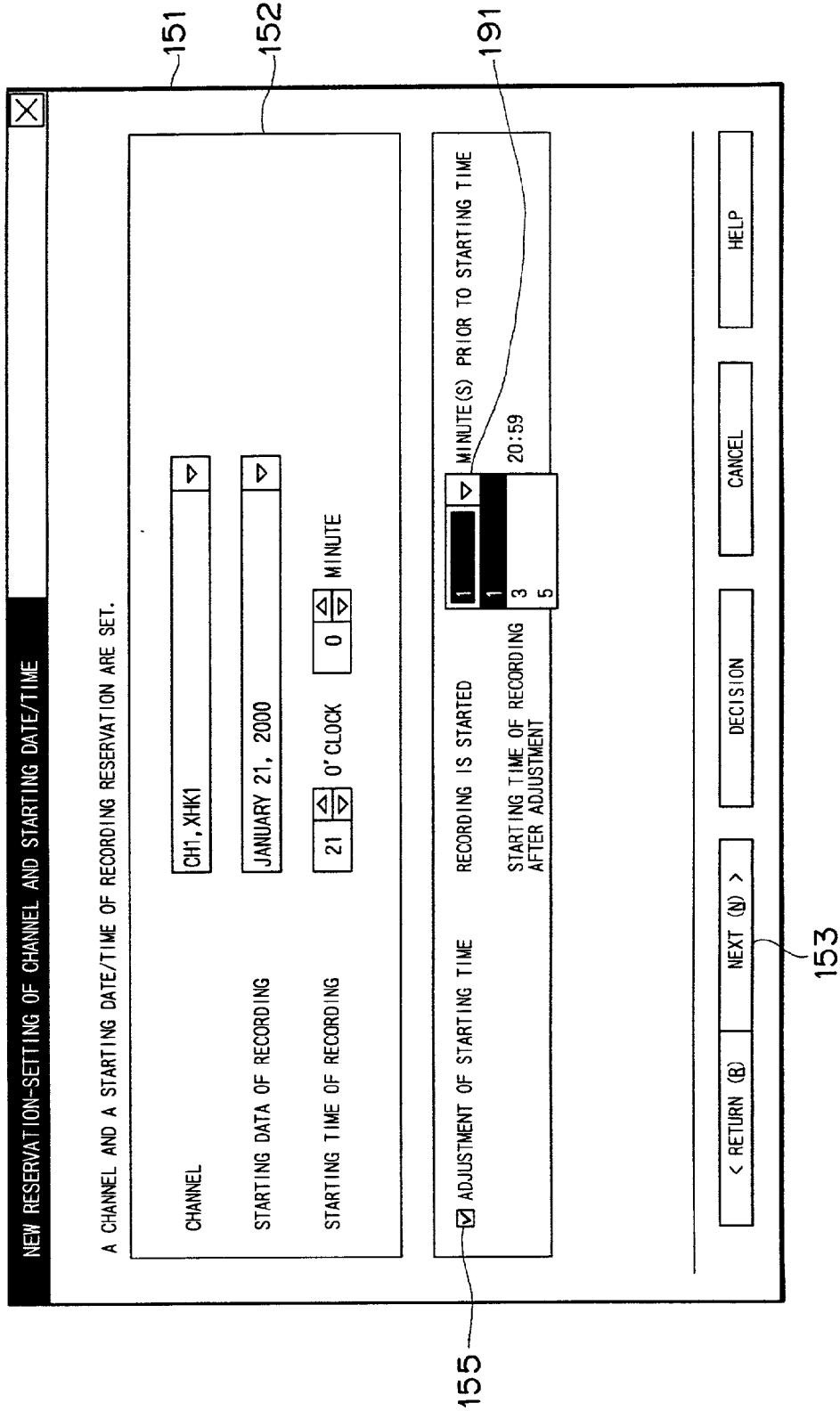

On the other hand, if it is discriminated in step S26 that the check box 155 is checked, then in step S27, the GUI input/output control section 131 renders a starting time adjustment list box 191 active (that is, into a state wherein the user can input setting of a numerical value) as seen in FIG. 15. In this state, the user can input an adjustment time for the starting time. The adjustment for the starting time may be, for example, arbitrarily selected from among 1 minute, 3 minutes and 5 minutes.

In step S28, the GUI input/output control section 131 discriminates whether or not an "adjustment of ending time" check box 165 of the GUI 161 shown in FIG. 10 is checked. If it is discriminated in step S28 that the "adjustment of ending time" check box 165 is not checked, then the processing advances to step S30.

If it is discriminated in step S28 that the "adjustment of ending time" check box 165 is checked, then in step S29, the GUI input/output control section 131 renders an extension setting list box 201 active (that is, into a state wherein the user can input setting of a numerical value) as seen in FIG. 16. In this state, the user can input an adjustment time for the ending time. The adjustment of the ending time can be, for example, arbitrarily selected from among 30 minutes, 60 minutes and 90 minutes.

In step S30, the GUI input/output control section 131 discriminates whether or not the "decision" button 164 is selected. If it is discriminated in step S30 that the "decision" button 164 is not selected, then the processing in step S30 is repeated until it is discriminated that the "decision" button 164 is selected.

If it is discriminated in step S30 that the "decision" button 164 is selected, then in step S31, the GUI input/output control section 131 reads in the setting inputted to the setting inputting section 152 and the setting inputting section 162 and outputs the setting to the AV contents production section 132. The AV contents production section 132 produces, based on the inputted setting, AV contents including information for recording reservation and records the AV contents into the contents database 92.

In step S32, the CPU 21 ends the recording reservation setting program 83 and thereby ends the processing.

In this manner, upon setting of recording reservation, a user can perform adjustment of the starting time and the ending time of a broadcasting program to be recorded. In particular, since the user can confirm whether or not the time indicated by the RTC 35 of the personal computer 1 is correct, setting for advancing the recording starting time can be performed simply based on the information so that recording may be started earlier than the starting time of the program to be recorded. Further, where there is the possibility that the ending time of a program to be recorded may be varied, for example, by elongation of a broadcast of a baseball game, elongation of the ending time of recording can be set simply by the user so that the program can be recorded to the last end thereof.

In the RTC correction process described hereinabove with reference to FIG. 6 and the recording reservation setting process described with reference to FIG. 13, when correction of the RTC 35 cannot be performed successfully, the information of the failure in correction of the RTC 35 is recorded into the log memory 123 (step S9 of FIG. 6) and it is displayed on the GUI 151 which is the recording reservation setting screen that the RTC 35 is not corrected (step S24 of FIG. 13). However, when correction of the RTC 35 is not performed successfully, the RTC 35 may otherwise be corrected based on the correction history in the past recorded in the log memory 123.

Figure 17:
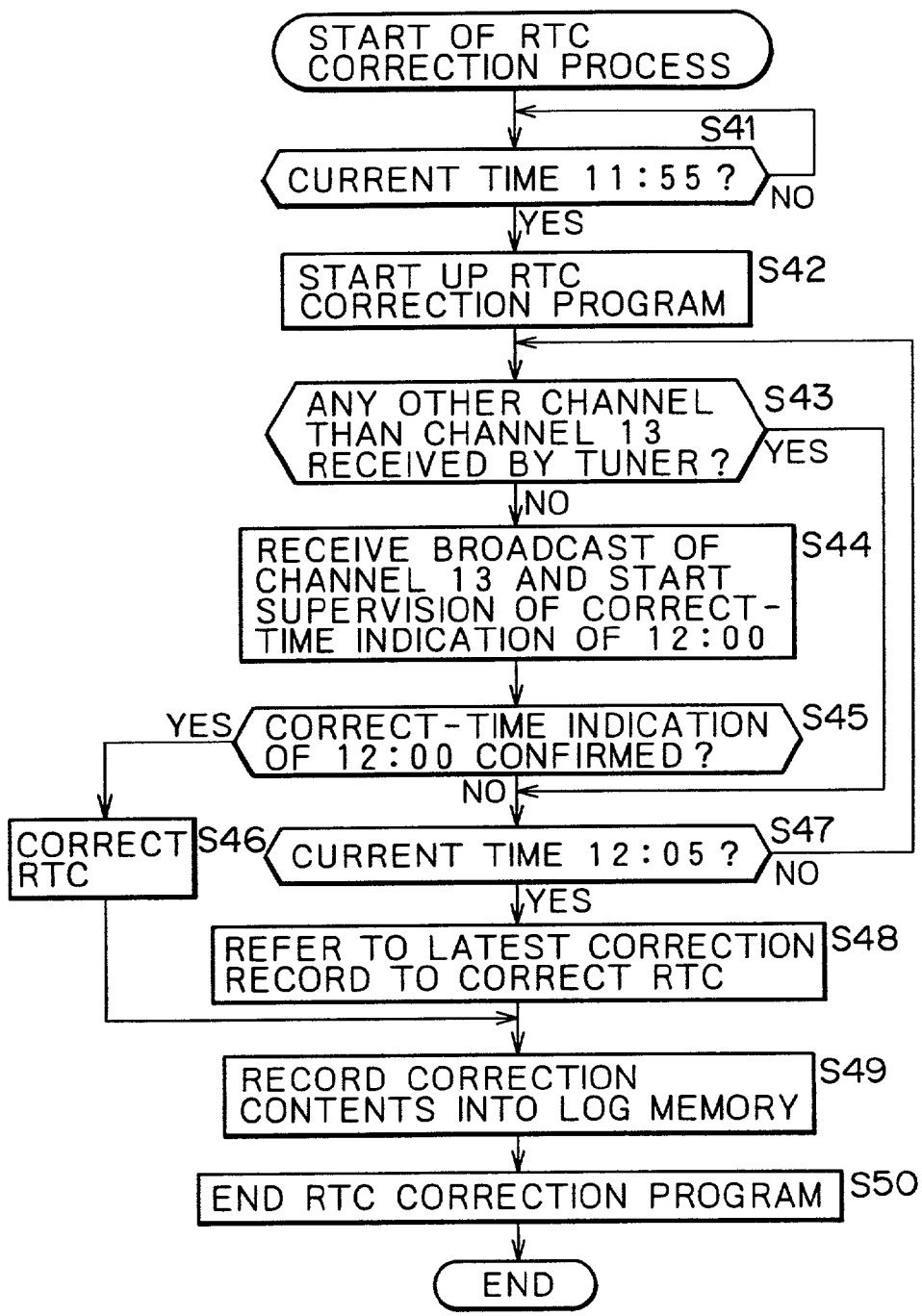
FIG. 17 is a flow chart illustrating another RTC correction process.

Here, an RTC correction process where the RTC 35 is corrected based on the correction history in the past recorded in the log memory 123 is described with reference to a flow chart of FIG. 17.

Figure 6:
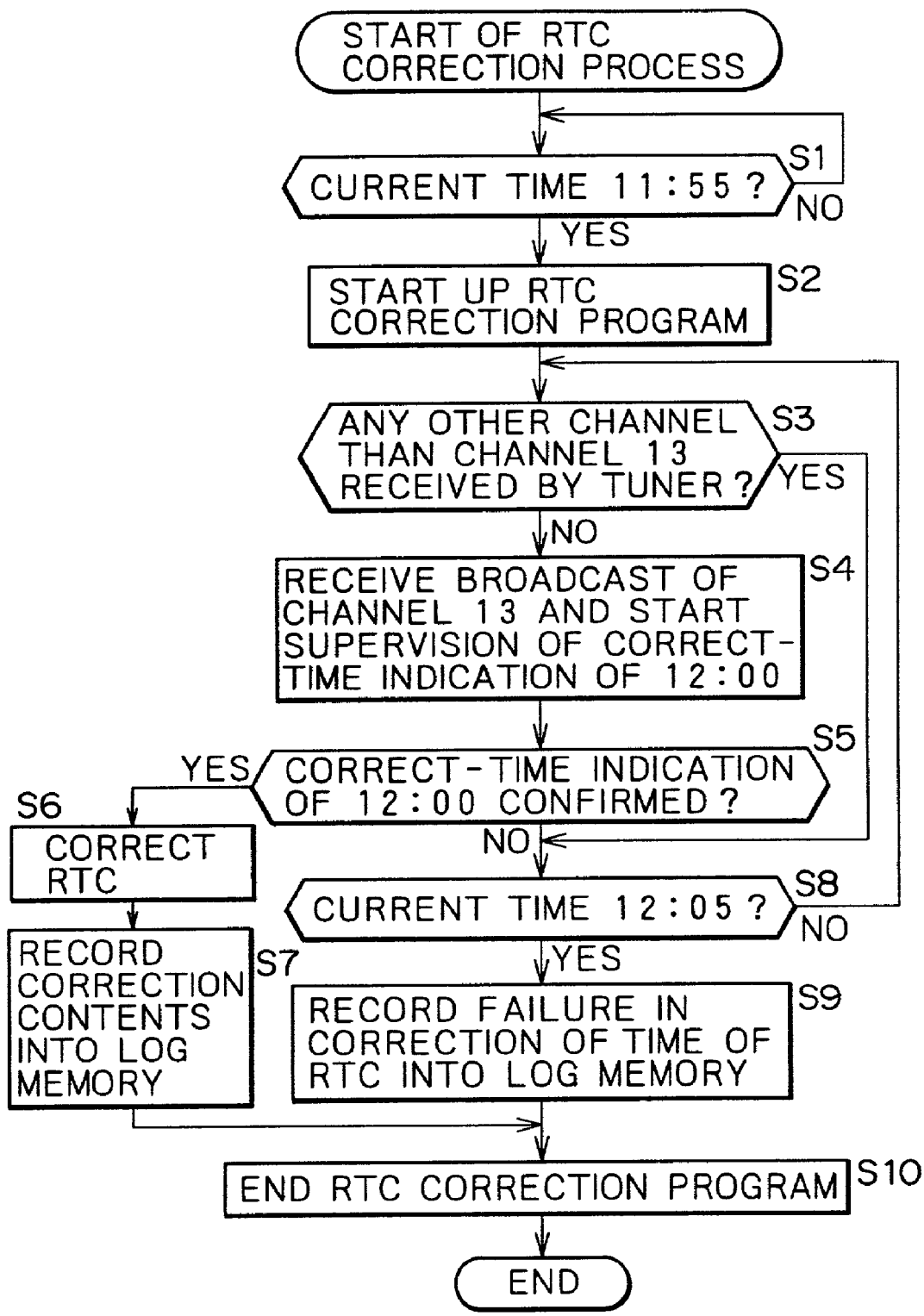
FIG. 6 is a flow chart illustrating an RTC correction process.

In steps S41 to S45, processing similar to that in steps S1 to S5 of FIG. 6 is performed. In particular, when it is discriminated that the time indicated by the RTC 35 is 11:55, the CPU 21 starts up the RTC correction program 82. Then, if the tuner 54 is not receiving a broadcast of a channel other than the channel 13, the correction processing section 121 controls the tuner 54 to receive a broadcast of channel 13 and supervises the correct-time indication at 12:00 to discriminate whether or not the correct-time indication at 12:00 is confirmed successfully.

If it is discriminated in step S45 that the correct-time indication at 12:00 is confirmed successfully, then in step S46, the correction processing section 121 executes processing similar to that in step S6 of FIG. 6 to correct the setting time of the RTC 35. Then, the processing advances to step S49.

If it is discriminated in step S45 that the correct-time indication at 12:00 is not confirmed successfully, then in step S47, the correction processing section 121 executes processing similar to that in step S8 of FIG. 6 to discriminate whether or not the present time is 12:05. If it is discriminated in step S47 that the present time is not 12:05, then the processing returns to step S43 so that the processing in step S43 et seq. described above is repeated.

If it is discriminated in step S47 that the present time is 12:05, then in step S48, the correction processing section 121 refers to the latest correction record from within the correction history in the past recorded in the log memory 123 and performs similar correction to the latest correction for the RTC 35.

In step S49, the correction processing section 121 records contents of the correction of the RTC 35 executed in step S46 or S48 into the log memory 123.

In step S50, the CPU 21 ends the RTC correction program 82 and thereby ends the processing.

Here, when correction of the setting time of the RTC 35 through detection of a correct-time indication is not performed successfully, the setting time of the RTC 35 is corrected based on the latest correction in the correction history. However, correction of the setting time of the RTC 35 may otherwise be performed using some other method such as, for example, a method wherein the setting time is corrected with an average value calculated from correction values for the setting time for a predetermined number of days.

Figure 18:
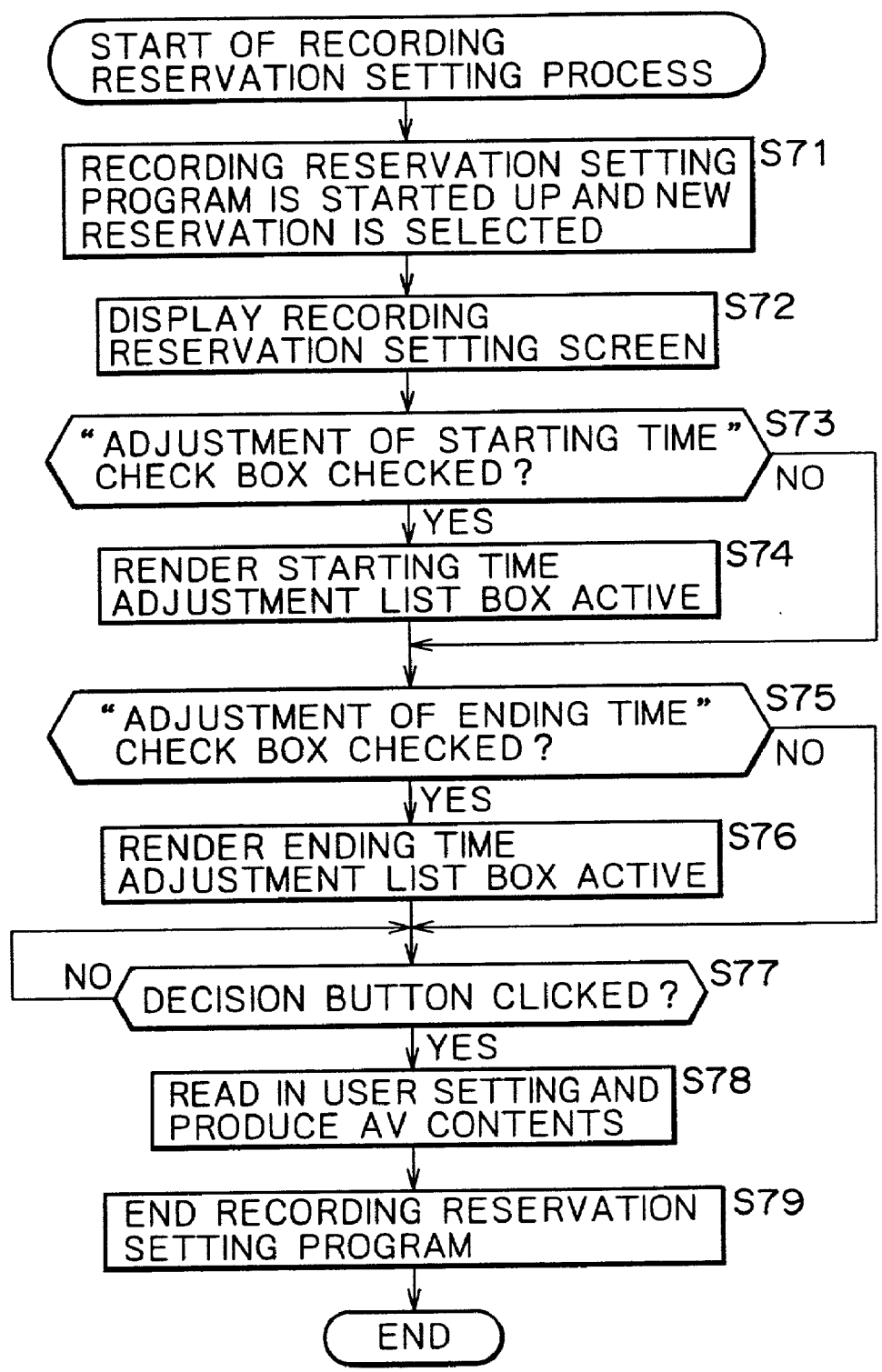
FIG. 18 is a flow chart illustrating another recording reservation setting process.

When the RTC correction process described above with reference to FIG. 17 is executed, the RTC 35 is corrected within the period from 11:55 to 12:05 without fail. The recording reservation setting process in this instance is described with reference to a flow chart of FIG. 18.

Figure 13:
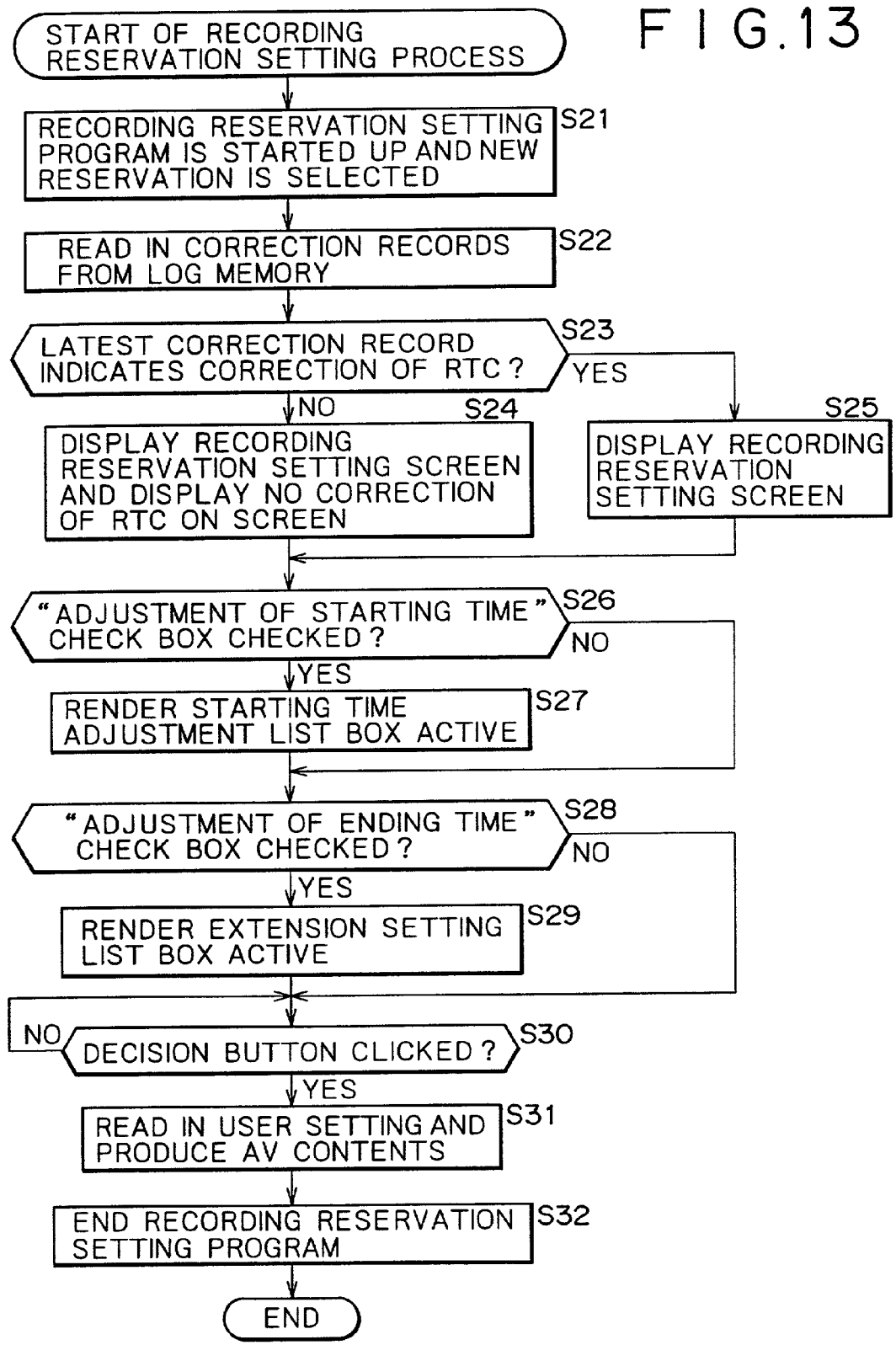
FIG. 13 is a flow chart illustrating a recording reservation setting process.

In step S71, the CPU 21 executes processing similar to that in step S21 of FIG. 13 to start up the recording reservation setting program 83. The GUI input/output control section 131 reads out data corresponding to the GUI 141 described hereinabove with reference to FIG. 8 from the HDD 31 and causes the CRT 30 to display the data. Then, the GUI input/output control section 131 receives a signal indicating that new reservation is selected from within the menu 143 by the user using the keyboard 28 or the mouse 29.

In step S72, the GUI input/output control section 131 reads out data corresponding to the GUI 151 shown in FIG. 14 from the HDD 31 and causes the CRT 30 to display the data. Here, since the RTC 35 is corrected without fail by the RTC correction processing described above with reference to FIG. 17, such a message 154 indicating that the RTC 35 is not corrected successfully as seen in FIG. 9 is displayed by no means.

Then in steps S73 to S79, processing similar to that in steps S26 to S32 of FIG. 13 is executed so that AV contents based on setting of recording reservation inputted by the user are produced and recorded into the contents database 92. Thereafter, the processing is ended.

Due to the processing described above, even if a correct-time indication cannot be detected and the setting time of the RTC 35 cannot be corrected typically because some other channel is received around 12:00, the setting time of the RTC 35 is corrected based on the correction history recorded in the log memory 123. Also in this instance, the user can confirm the correction history of the RTC 35 recorded in the log memory 123 by causing the GUI 181 described hereinabove with reference to FIG. 12 to be displayed on the CRT 30.

While the series of processes described above can be executed by hardware, it may otherwise be executed by software. Where the series of processes is executed by software, a program which constructs the software is installed from a program storage medium into a computer incorporated in hardware for exclusive use or, for example, a personal computer for universal use which can execute various functions by installing various programs.

Figure 3:
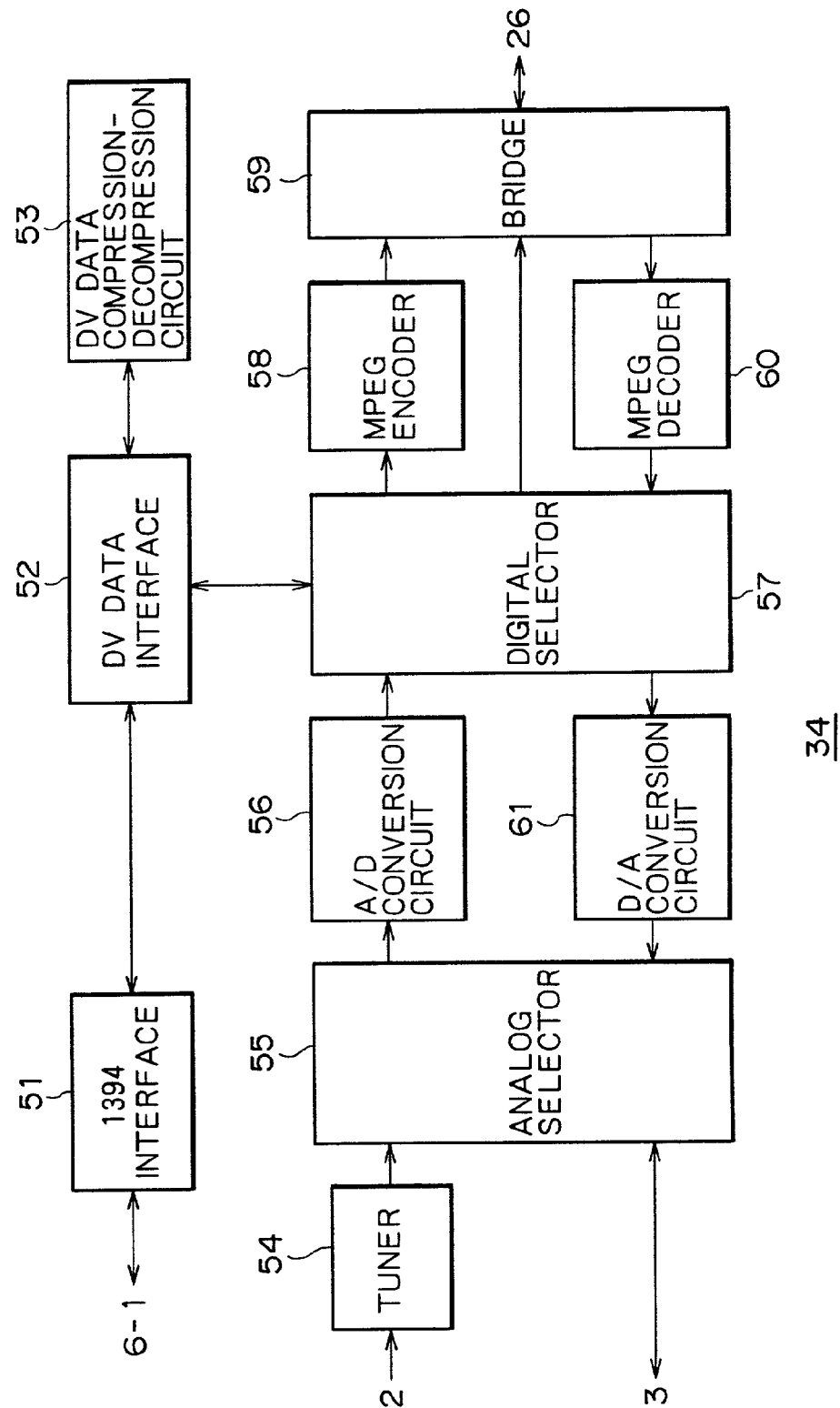
FIG. 3 is a block diagram showing a construction of an image processing board shown in FIG. 2.

The program storage medium for storing a program which is to be installed into and executed by a computer is formed as a package medium such as, as shown in FIG. 3, a magnetic disk 101 (including a floppy disk), an optical disk 102 (including a CD-ROM (Compact Disk-Read Only Memory) and a DVD (Digital Versatile Disk)), or a magneto-optical disk 103 (including an MD (Mini-Disk)), or a semiconductor memory 104 which has the program recorded temporarily or permanently thereon or therein. Storage of a program onto or into a program storage medium is performed when necessary making use of a wired or wireless communication medium such as a local area network, the Internet or a digital satellite broadcast through an interface such as the 1394 interface 51 shown in FIG. 4.

Further, in the present specification, the steps which describe the program stored in or on a program storage medium may be but need not necessarily be processed in a time series in the order as described, and include processes which are executed parallelly or individually without being processed in a time series.

It is to be noted that, in the present specification, the term "system" represents an entire apparatus which is composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:
   a clock configured to supply time information used to manage an operation of the information processing apparatus;
   a receiver configured to control reception of a broadcast signal;
   a detection unit configured to detect predetermined information from the broadcast signal received by the receiver within a predetermined period of time based on the time information supplied by the clock;
   a processor configured to correct the time information supplied by the clock based on a result of the detection of the predetermined information by the detection unit; and
   a memory configured to record a result of the correction of the time information performed by the processor, wherein
   when the detection unit fails to detect the predetermined information, the processor corrects the time information supplied from the clock based on a most recent result of the correction of the time information recorded in the memory.

2. An information processing apparatus according to claim 1, further comprising:
   a controller configured to display the result of the correction of the time information recorded in the memory.

3. An information processing apparatus according to claim 2, wherein:
   the processor is configured to correct the time information supplied from the clock when the predetermined information is detected by the detection unit; and
   the controller is configured to control the display of a message representative of failure in correction of the time information when the correction of the time information cannot be performed.

4. An information processing apparatus according to claim 1, wherein:
   the memory is configured to store the result of a failure of the correction of time information when the correction of time information cannot be performed by the processor.

5. An information processing method, comprising the steps of:
   supplying time information used to manage an operation of an information processing apparatus;
   controlling reception of a broadcast signal;
   detecting predetermined information from the broadcast signal based on the time information supplied in the supplying step;
   correcting the time information supplied in the supply step based on a result of the detection of the predetermined information in the detecting step; and
   recording a result of the correction of the time information performed in the correcting step, wherein
   when the predetermined information cannot be detected in the detecting step, the time information supplied in the supplying step is corrected based on a most recent stored result of the correction of the time information.

6. An information processing method according to claim 5, further comprising:
   displaying the result of the correction of the time information performed in the correcting step.

7. An information processing method according to claim 6, wherein:
   the step of correcting the time information is performed when the predetermined information is detected in the detecting step; and
   the step of, displaying a message representative of the result of the correction of the time information includes displaying a result indicating a failure in correction of the time information when the correction of the time information cannot be performed in the correcting step.

8. An information processing method according to claim 5, wherein:
   the step of recording the result of the correction of the time information includes recording a failure when the time information cannot be corrected in the correcting step.

9. A program storage medium on which a computer-readable program is recorded, the program, when executed, performing a method comprising the steps of:
   supplying time information used to manage an operation of an information processing apparatus;
   controlling reception of a broadcast signal;
   detecting predetermined information from the broadcast signal based on the supplied time information supplied in the supplying step;
   correcting the time information supplied in the supply step based on a result of the detection of the predetermined information in the detecting step; and
   recording a result of the correction of the time information performed in the correcting step, wherein
   when the predetermined information cannot be detected in the detecting step, the time information supplied in the supplying step is corrected based on a most recent stored result of the correction of the time information.

10. A program storage medium according to claim 9, further comprising:
    displaying the result of the correction of the time information performed in the correcting step.

11. A program storage medium according to claim 10, wherein
    the step of correcting the time information is performed when the predetermined information is detected in the detecting step; and
    the step of, displaying the result of the time correction includes displaying a message representative of failure in correction of the time information when the correction of the time information cannot be performed in the correcting step.

12. A program storage medium according to claim 9, wherein:
    the step of recording the result of the correction of the time information includes recording a failure when the time information cannot be corrected in the correcting step.

13. A system for storing time correction information, comprising:
    means for supplying time information used to manage an operation of an information processing apparatus;
    means for controlling the reception of a broadcast signal;
    means for detecting predetermined information from the broadcast signal received by the controlling means based on the time information supplied by the supplying means;
    means for correcting the time information supplied by the means for supplying based on a result of the detection of the predetermined information by the means for detecting; and
    means for storing a result of a correction of the time information performed by the correcting means, wherein
    when the means for detecting fails to detect the predetermined information, the means for correcting corrects the time information supplied from the means for supplying based on a most recent result of the correction of the time information recorded in the means for storing.

* * * * *